United States Patent [19]

Yasui et al.

[11] Patent Number: 4,848,503
[45] Date of Patent: Jul. 18, 1989

[54] SMALL SNOWMOBILE AND DRIVE ARRANGEMENT THEREFOR

[75] Inventors: Toshihiro Yasui; Masanobu Yamamoto, both of Iwata, Japan

[73] Assignee: Yamaha Hatsudoki Kabushiki Kaisha, Iwata, Japan

[21] Appl. No.: 164,241

[22] Filed: Mar. 4, 1988

[30] Foreign Application Priority Data

Mar. 6, 1987 [JP] Japan .................................. 62-51548

[51] Int. Cl.⁴ ............................................ B62M 27/02
[52] U.S. Cl. .................................................... 180/190
[58] Field of Search ................ 180/190, 191, 192, 193

[56] References Cited

U.S. PATENT DOCUMENTS 3,734,221 5/1973 Labelle .................................. 180/190
4,023,635 5/1977 Teal ...................................... 180/190

FOREIGN PATENT DOCUMENTS 1436267 5/1976 United Kingdom ................ 180/192

Primary Examiner—John A. Pekar
Attorney, Agent, or Firm—Ernest A. Beutler

[57] ABSTRACT

A small snowmobile powered by a scooter type engine transmission mechanism incorporating a kick starter that is positioned to be operated by a rider seated upon the seat of the snowmobile.

5 Claims, 3 Drawing Sheets

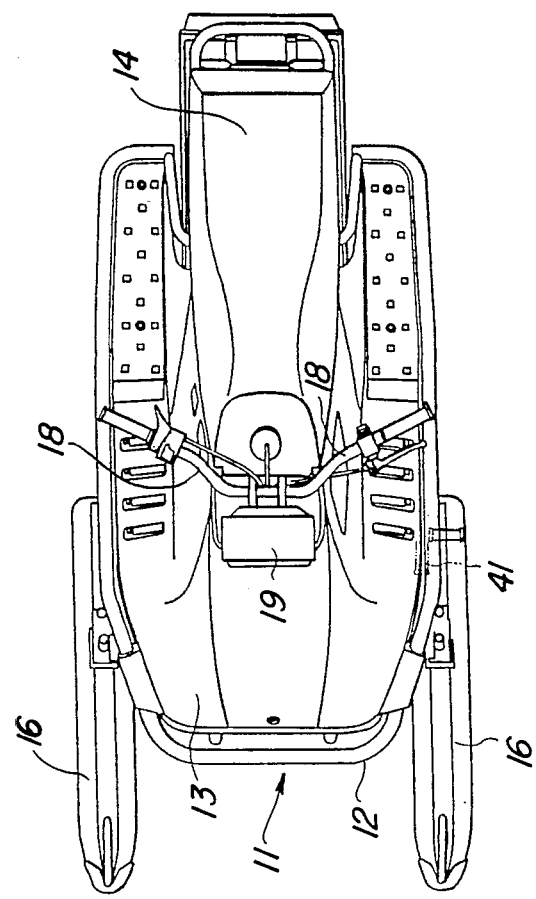

SMALL SNOWMOBILE AND DRIVE ARRANGEMENT THEREFOR

BACKGROUND OF THE INVENTION

This invention relates to a small snowmobile and a drive arrangement therefor and more particularly to an improved power unit and transmission mechanism for a small snowmobile.

As is well known, snowmobiles are highly popular vehicles. Snowmobiles are used for a wide variety for recreational and work purposes. As the popularity of snowmobiles has grown, the size and power output of these machines has grown proportionately. As a result, many of the snowmobiles now sold are very large machines and are designed so as to accommodate plural riders. Although such large and heavy machines have great appeal, there is an interest in a smaller lighter machine that can be conveniently operated and used by a single person. The advantages of such small light weight machines should be readily apparent.

In order to provide a small light weight snowmobile it is still necessary to provide an effective power unit for it. The type of power unit employed for small motor scooters that consist primarily of a single cylinder internal combustion engine and a continuously variable belt type transmission provides an excellent power unit for small snowmobiles. It is, therefore, a principal object of this invention to provide a small snowmobile design which is capable of being powered by the engine variable speed drive of the type normally used in a motor scooter.

It is a further object of this invention to provide an improved simplified and light weight power unit for a small snowmobile.

As the size of conventional snowmobiles has grown and the power units have become larger, it has been the practice to employ electric starters for this type of machine. However, the provision of an electrical starter gives rise to the necessity of providing a charging system for a battery to power the starter and also add significantly to the weight of the machine. Although pull type starters have been employed for snowmobiles, such starters are not particularly convenient.

It is, therefore, a still further object of this invention to provide an improved kick starter mechanism that can be utilized with a small snowmobile.

SUMMARY OF THE INVENTION

The first feature of the invention is adapted to be embodied in a power unit for a small snowmobile having a body assembly provided with a seat on which a rider may sit and a driving belt for powering the vehicle. The driving belt has a driving pulley rotatable about an axis that extends transversely across the width of the vehicle. A combined engine transmission assembly is mounted by the body forwardly of the driving belt. This assembly includes an internal combustion engine having an output shaft that is rotatable about an axis that extends transversely to the vehicle. This output shaft drives a variable diameter pulley which, in turn, drives a further variable diameter pulley through a belt. The further pulley is drivingly coupled to the driving pulley of the drive belt.

Another feature of the invention is also adapted to be embodied in a small snowmobile having a body, a seat designed to accommodate a single rider seated in straddle fashion and a driving belt that is positioned beneath the seat. In accordance with this feature of the invention, a power unit is supported by the body and is drivingly connected to the drive belt for driving the vehicle. The power unit includes an internal combustion engine having an output shaft and a kick starter mechanism is operatively connected to the output shaft for kick starting of the engine. The kick starter mechanism is disposed in a position to be operated by the foot of an operator seated upon the seat.

BRIEF DESCRIPTION OF THE DRAWINGS

FIG. 3 is a top plan view of the snowmobile.

DETAILED DESCRIPTION OF THE PREFERRED EMBODIMENT OF THE INVENTION

Figure 1:
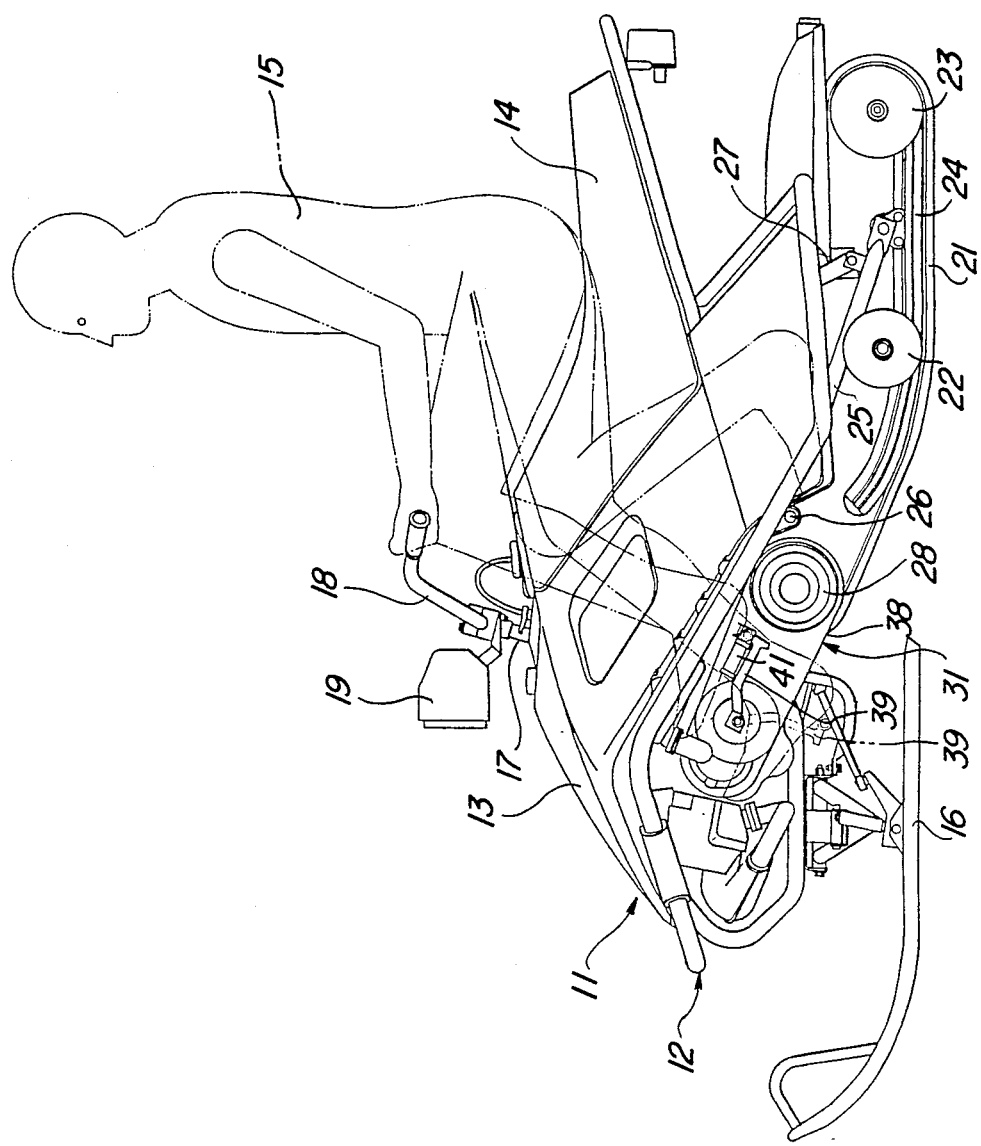
FIG. 1 is a side elevational view of a small snowmobile constructed in accordance with an embodiment of the invention.

The reference numeral 11 indicates generally a small snowmobile constructed in accordance with an embodiment of the invention. The small snowmobile 11 is comprised of a frame assembly, indicated generally by the reference numeral 12 which may be of the welded up tubular type. The construction of the frame assembly 12 is described in more detail in copending application entitled "Frame and Body Construction For Small Snowmobile," patent application Ser. No. 163,389, filed Mar. 2, 1988 in the names of Toshihiro Yasui, Tsuneo Isobe and Masanori Sugita, which is incorporated herein by reference. A body 13, which may be of moulded fiberglass or the like and which is configured as described in said copending application Ser. No. 163,389 is mounted on the frame assembly 12 in a manner as described in that application. A seat 14 is carried by the frame 12 rearwardly of the body portion 13 and is designed to accommodate a single rider, shown in phantom in FIG. 1 and identified at 15.

A pair of front skis 16 are supported at the forward portion of the frame 12 in a manner as described in the copending application entitled "Frame Construction For Small Snowmobile", patent application Ser. No. 162,733, filed Mar. 1, 1988 in the names of Toshihiro Yasui and Masanori Sugita and assigned to the assignee of this application. The front skis 16 are steered by means of a steering shaft 17 and handlebar assembly 18 that is journaled by the frame 12 forwardly of the seat 14 in a convenient location for operation by the rider 15. If desired, a headlight 19 may be supported by the steering shaft assembly 17 in a known manner for night riding.

A driving belt 21 is positioned beneath the seat 14 and extends rearwardly relative to the seat. The driving belt 21 is trained around a pair of idler sprockets 22 and 23 which are journaled upon a pair of guide rails 24. The guide rails 24 are supported for suspension movement relative to the frame assembly 12 by means of a pair of trailing arms 25. The trailing arms 25 are journaled on the frame assembly 12 by means of pivot pins 26. A combined spring shock absorber assembly 27 controls the pivotal movement of the arms 25 and, accordingly, the movement of the guide rails 24.

A pair of driving sprockets 28 are affixed to a driven shaft 29 and are engaged with teeth on the belt 21 for driving it. The driven shaft 29 is driven by a power unit, indicated generally by the reference numeral 31. The power unit 31 is suspended within the frame assembly 12 in a manner as described in the copending application entitled "Engine Mounting Arrangement For Small Snowmobile," patent application Ser. No. 162,179, filed Feb. 29, 1988, in the names of Toshihiro Yasui, Tsuneo Isobe, Masanori Sugita and Haruhiko Nakanosono, which application is assigned to the assignee of this application. Basically, the power unit 31 is of the type employed conventionally for powering motor scooters or the like. The power unit 31 includes an internal combustion engine 32 which is depicted as being of the single cylinder type and which is disposed so that its cylinder extends in a substantially horizontal plane and lies forwardly relative to its output shaft 33. The output shaft 33 drives a driving pulley 34 of the variable sheave type. The driving shaft 33 drives a driven pulley 35 by means of a belt 36. The driven pulley 35 is associated with the drive shaft 29 for driving it in a suitable manner via a centrifugal clutch 37. The transmission assembly comprised of the variable pulleys 34 and 35, driving belt 36 and centrifugal clutch 37 are contained within a transmission casing 38.

Figure 2:
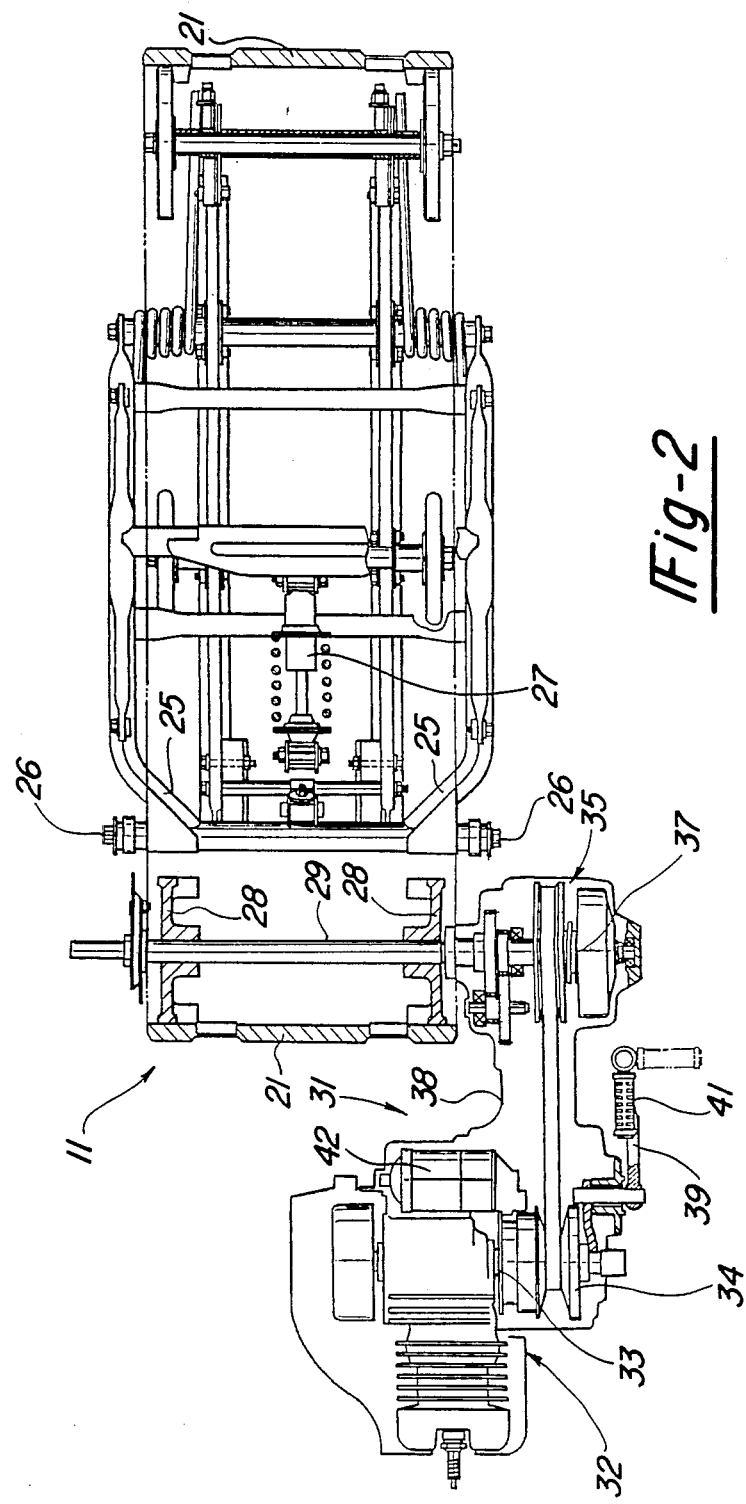
FIG. 2 is an enlarged top plan view showing the drive mechanism of the snowmobile, with portions broken away and other portions shown in sections.

The engine 32 is provided with a kick starter mechanism of a suitable type which includes a starter lever 39 that is connected by means of a ratchet mechanism to the engine output shaft 33. A starting pedal 41 is pivotally connected to the outer end of the starter lever 39 for movement between a storage position as shown in the solid line views of FIGS. 1 and 2 and the broken line view of FIG. 3 and an operative position as shown in the broken line views of FIGS. 1 and 2 and the solid line view of FIG. 3. It should be noted that in this operative position the starter pedal 41 is positioned so as to be conveniently operated by the foot of the rider 15 seated upon the seat 14.

A generator mechanism 42 is driven by the engine output shaft 33 for providing a source of electricity for firing the spark plug of the engine 32 and also for powering the headlight 19 and other purposes.

It should be readily apparent from the foregoing description that a highly effective and compact power unit is provided for a snowmobile which permits the formation of a small light weight snowmobile. The power unit uses a variable speed transmission of the belt type and also is provided with a kick starter that can be conveniently operated by a rider seated on the snowmobile. The foregoing description is, of course, only that of a preferred embodiment of the invention and various changes and modifications may be made without departing from the spirit and scope of the invention, as defined by the appended claims.

We claim:

1. A small snowmobile comprised of frame means, a seat carried by said frame means and configured to accommodate a single rider seated in straddle fashion thereupon, a driving belt supported beneath said seat for powering said snowmobile, a power unit for driving said driving belt comprised of an internal combustion engine supported within said frame means forwardly of and beneath said seat and having its output shaft rotating about an axis extending transversely of said snowmobile, a continuously variable belt transmission driven by said engine output shaft and having a driven shaft drivingly coupled to said drive belt for driving said drive belt, and a kick starter mechanism for said engine and disposed in a position to be operated by a rider seated upon said seat.

2. A small snowmobile as set forth in claim 1 wherein the kick starter mechanism is operatively connected to the engine output shaft through a ratchet mechanism.

3. A small snowmobile having frame means as set forth in claim 1 further including steering means disposed forwardly of the seat and positioned to be operated by a rider seated thereupon.

4. A small snowmobile having frame means, a seat carried by said frame means and designed to accommodate a single rider seated in straddle fashion thereupon, a drive belt for said snowmobile positioned beneath said seat, a power unit supported by said frame means for driving said drive belt forwardly of and beneath said seat, and a kick starter mechanism for said power unit including a starting lever positioned forwardly of said seat in a position to be engaged by a foot of a rider seated upon said seat.

5. A small snowmobile having frame means as set forth in claim 4 further including steering means disposed forwardly of the seat and positioned to be operated by a rider seated thereupon.

* * * * *